United States Patent [19]
Sandahl

[11] 4,123,139
[45] Oct. 31, 1978

[54] OPTICAL FIBER CONNECTOR

[75] Inventor: Carl R. Sandahl, Morristown, N.J.

[73] Assignee: Bell Telephone Laboratories, Incorporated, Murray Hill, N.J.

[21] Appl. No.: 754,601

[22] Filed: Dec. 27, 1976

[51] Int. Cl.² ............................................. G02B 5/14
[52] U.S. Cl. ............................................. 350/96.21
[58] Field of Search ................................. 350/96 C

[56] References Cited

U.S. PATENT DOCUMENTS

| | | | |
|---|---|---|---|
| 3,989,567 | 11/1976 | Tardy | 350/96 C |
| 4,019,241 | 4/1977 | Logan | 350/96 C X |
| 4,047,796 | 9/1977 | Kao et al. | 350/96 C |
| 4,050,783 | 9/1977 | Tardy | 350/96 C |

*Primary Examiner*—John K. Corbin
*Assistant Examiner*—Rolf Hille
*Attorney, Agent, or Firm*—A. A. Tirva; John K. Mullarney

[57] ABSTRACT

An optical fiber connector includes a male connector portion having at least three cylindrical inner rods held in tangential contact with each other. The inner rods form an opening which contains and accurately positions an optical fiber within the male connector portion. A female connector portion has at least three cylindrical outer rods arranged to form a nest to accommodate the inner rods. Nesting of the inner rods within the outer rods positions the fiber, with a high degree of accuracy, within the female connector portion.

2 Claims, 2 Drawing Figures

OPTICAL FIBER CONNECTOR

BACKGROUND OF THE INVENTION

This invention relates to optical fiber communication systems and, particularly, to a connector for connecting two optical fibers used in such systems.

In an optical communication system, it is necessary to couple optical fibers end-to-end, as well as to devices such as detectors or signal generators. Coupling of optical fibers in end-to-end relationship is a difficult task, particularly when high coupling efficiencies are required. Any axial misalignment of the fibers in the coupling will attenuate the signal across the coupling.

In the past, connectors have been built which do provide good axial alignment for fibers to be connected. However, building of such connectors requires a number of difficult machining operations in order to reduce the tolerance build-up between the connector parts, or requires conditions of assembly which, while fairly readily attainable in the laboratory, are not easily obtained in the field. Ideally, an optical fiber connector should be relatively simple, inexpensive, be capable of being coupled and uncoupled many times without degradation of coupling efficiency, and provide accurate axial alignment between two optical fibers.

Therefore, it is an object to provide another optical fiber connector which provides good axial alignment between two optical fibers.

Another object is to provide a relatively low cost optical fiber connector.

Yet another object is to provide an optical fiber connector which utilizes commercially available, low cost precision components.

These and other objects of the invention are realized in one illustrative embodiment thereof wherein an optical fiber connector has a male connector portion having at least three cylindrical inner rods held in tangential contact with each other forming an opening which contains an optical fiber. A female connector portion has at least three cylindrical outer rods arranged to form a nest to accommodate the inner rods. Nesting of the inner rods within the outer rods positions the fiber, with a high degree of accuracy, within the female connector portion.

A feature of the invention is arrangement of the outer rods so that they form a nest to accommodate the inner rods. This arrangement permits accurate positioning of the fiber within the female connector.

Another feature of the invention is that the nest formed by the outer rods accommodates end-to-end the inner rods of two substantially identical male connector portions, thereby permitting accurate positioning and axial alignment in the end-to-end coupling of the fibers held by the two male connector portions.

Another feature of the invention is that each outer rod contacts at least one inner rod to thereby fixedly position the optical fiber.

Another feature of the invention is that each inner and outer rod is a precision bearing roller, which is a low cost, commercially available item.

Yet another feature is that the outer rods are in tangential contact with each other. This arrangement permits precise control of the size of the nest formed by the outer rods.

BRIEF DESCRIPTION OF THE DRAWING

A better understanding of the invention may be derived from the detailed description following as that description is used with respect to the attached drawings in which.

DETAILED DESCRIPTION

Figure 1:
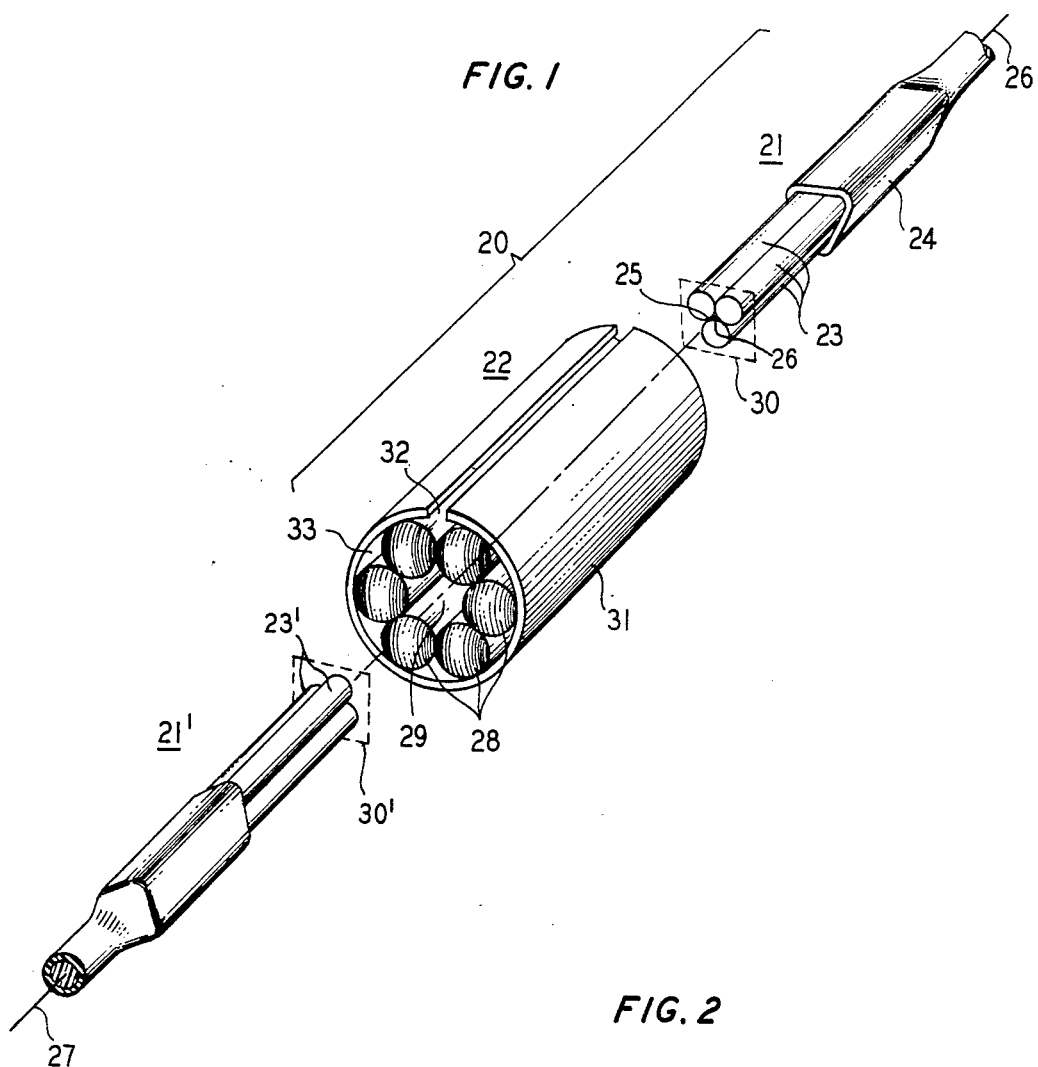
FIG. 1 is a perspective view of an optical fiber connector embodying the present invention.

In the embodiment of the invention illustrated in FIG. 1, an optical fiber connector 20 comprises a male connector portion 21 and a female connector portion 22. The male connector portion 21 has three substantially identical parallel, cylindrical inner rods 23 which are held in tangential contact with each other by heat shrinkable tubing 24. The three inner rods 23 are made of chrome steel and are sold commercially as bearing rollers. The rods are available in various lengths and diameters. The tolerance on each diameter is held, for example, to ± 0.00001 inch.

The three inner rods 23 are held in tangential contact with each other along their entire length forming an opening 25. The size of the opening 25 is precisely controlled by controlling the diameter $D_1$ of each of the inner rods 23.

An optical fiber 26 is disposed within the opening 25 which accurately positions the fiber 26 within the male connector portion 21. A typical optical fiber comprises a core surrounded by a cladding, both usually made of glass and a protective sleeve, usually made of nylon. The end of the fiber 26 to be inserted into the opening 25 is stripped of its protective nylon coating so that the cladding of the fiber 26 is exposed. The stripped end of the fiber 26 is then inserted into the opening 25 until it extends slightly past the planar surface 30 containing the inner rods 23. The diameter $D_1$ of each of the inner rods 23 is related to the diameter $d$ of the stripped portion of the fiber 26, for example, by the following expression:

$$D_1 = 6.4627d.$$

Figure 2:
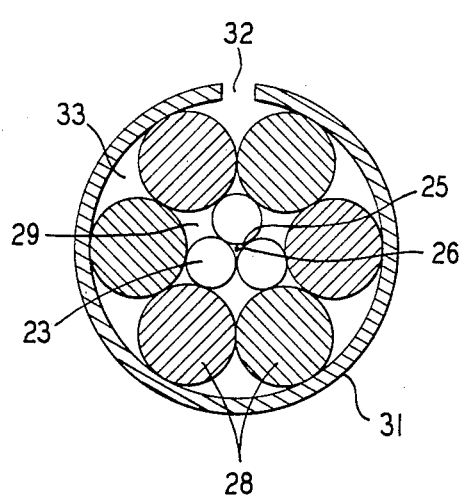
FIG. 2 is a cross-sectional view of the connector shown in FIG. 1, with the inner rods of the male connector portion nested within the outer rods of the female connector portion.

Once the stripped end of fiber 26 is within the opening 25, an adhesive, such as silicone rubber, is inserted into the spaces of opening 25 not occupied by the fiber 26. After the adhesive sets and fastens the fiber 26 and the three inner rods 23 together, the end of the fiber 26 is polished until it is flush with the ends of the inner rods 23 and lies in a planar surface 30, which is substantially perpendicular to the longitudinal axis of the fiber 26. As shown in FIGS. 1 and 2, the female connector portion 22 comprises six substantially identical parallel, cylindrical outer rods 28 held together in tangential contact with each other by a cylindrical spring 31. The outer rods 28 are arranged to form a nest with an opening 29 which accommodates the inner rods 23. When the inner rods 23 are nested within the outer rods 28, each outer rod 28 contacts one of the inner rods 23 thereby fixedly positioning the optical fiber 26. Size of the opening 29 is precisely controlled by controlling the diameter $D_2$ of each of the outer rods 28. The diameter $D_2$ of each of the outer rods 28 is related to the diameter $D_1$ of each of the inner rods 23, for example, by the following:

$$D_2^2 - 2D_1D_2 + 0.1111D_1^2 = 0.$$

Nesting of the inner rods 23 within the outer rods 28 positions the fiber 26, with a high degree of accuracy, within the female connector portion 22.

The six outer rods 28 are held in tangential contact with each other by a cylindrical spring 31. The outer rods 28 are made of chrome steel and are sold commercially as bearing rollers. They are available in various lengths and diameters. The tolerance on each diameter is held, for example, to ± 0.00001 inch.

The cylindrical spring 31 is made from phosphor bronz tubing. The spring 31 has an opening 33 extending axially therethrough and a slit 32 extending the length of the spring 31 parallel to the longitudinal axis of the spring. The diameter of the opening 33 is made smaller than the major diameter of the nest formed by the six outer rods 28. Thus, when the outer rods 28 are inserted into the opening 33, slit 32 permits the opening 33 to expand to accommodate the outer rods 28. The diameter of the opening 33 and the wall thickness of the spring 31 are such that when the six outer rods 28 are within the opening 33, the spring 31 exerts sufficient radial pressure upon each of the outer rods 28 to keep the outer rods in tangential contact with each other. The outer rods 28 are provided with hemispherical ends to aid in the insertion of the inner rods 23 into the opening 33 formed by the outer rods.

To couple end-to-end the fiber 26 held by the male connector portion 21 and a fiber 27 held by a male connector portion 21', shown in FIG. 1, which is substantially identical to the male connector portion 21, the two male connector portions 21 and 21' are inserted from opposite ends into the female connector portion 22. The inner rods 23 of the male connector portion 21 and inner rods 23' of the male connector portion 21' are nested within the opening 29 formed by the outer rods 28. The nesting of the inner rods 23 and 23' within the opening 29 formed by the outer rods 28 accurately positions and thus axially aligns the two fibers 26 and 27 held by the inner rods 23 and 23', respectively. The fiber 26 terminating in the planar surface 30 and the fiber 27 terminating in a planar surface 30' are coupled end-to-end by bringing the two fiber ends together within the female connector portion so that the planar surface 30 is superimposed upon the planar surface 30'.

What is claimed is:

1. An optical fiber connector comprising:

identical first and second male connectors each having;

at least three substantially identical parallel cylindrical inner rods held in tangential contact with each other so that they form an internal nest therebetween, an optical fiber disposed within said nest, the end of said fiber and ends of said inner rods all terminating in a planar surface substantially perpendicular to the longitudinal axis of the fiber; and a separate female connector sleeve having at least six substantially identical parallel cylindrical outer rods held in tangential contact with each other so that they form an internal nest to accommodate the inner rods of said first and second male connectors, the diameter of said outer rods being substantially greater than the diameter of said inner rods, an outer spring means encompassing said outer rods and exerting radial pressure upon each of said outer rods to hold the same in fixed tangential contact with each other, the optical fibers in each of said first and second male connectors being coupled end-to-end in axial alignment by slidingly engaging said first and second male connectors into axial abutment with each other within the internal nest formed by said outer rods.

2. The connector as defined in claim 1 wherein the relative diameters $D_1$ and $D_2$ of the inner and outer rods respectively are related by the equation $$D_2^2 - 2D_1D_2 + 0.1111D_1^2 = 0.$$

* * * * *